United States Patent
Hanawa et al.

(10) Patent No.: US 9,879,598 B2
(45) Date of Patent: Jan. 30, 2018

(54) DIAGNOSIS DEVICE

(71) Applicant: ISUZU MOTORS LIMITED, Tokyo (JP)

(72) Inventors: Satoshi Hanawa, Fujisawa (JP); Tadashi Uchiyama, Kamakura (JP); Hidekazu Fujie, Yamato (JP); Naoto Murasawa, Yamato (JP)

(73) Assignee: ISUZU MOTORS LIMITED, Tokyo (JP)

( * ) Notice: Subject to any disclaimer, the term of this patent is extended or adjusted under 35 U.S.C. 154(b) by 91 days.

(21) Appl. No.: 14/908,294

(22) PCT Filed: Jul. 31, 2014

(86) PCT No.: PCT/JP2014/070196
§ 371 (c)(1),
(2) Date: Jan. 28, 2016

(87) PCT Pub. No.: WO2015/016303
PCT Pub. Date: Feb. 5, 2015

(65) Prior Publication Data
US 2016/0169100 A1 Jun. 16, 2016

(30) Foreign Application Priority Data
Jul. 31, 2013 (JP) .................................. 2013-159117

(51) Int. Cl.
*F02B 77/08* (2006.01)
*F02B 29/04* (2006.01)
(Continued)

(52) U.S. Cl.
CPC ............ *F02B 77/083* (2013.01); *F02B 29/04* (2013.01); *F02M 26/05* (2016.02); *F02M 26/22* (2016.02);
(Continued)

(58) Field of Classification Search
CPC ..................................................... F02B 77/083
See application file for complete search history.

(56) References Cited

U.S. PATENT DOCUMENTS

2009/0125217 A1* 5/2009 Nam .................. F02D 41/0052
701/108
2010/0043525 A1* 2/2010 Recouvreur .......... F01N 11/002
73/23.31
(Continued)

FOREIGN PATENT DOCUMENTS

JP 2013-108414 6/2013
JP 2013-108416 6/2013

OTHER PUBLICATIONS

Japan Platform for Patent Information, English Abstract of Japanese Publication No. 2013-108416 published Jun. 6, 2013.
(Continued)

*Primary Examiner* — Ryan Walsh
(74) *Attorney, Agent, or Firm* — Staas & Halsey LLP (57) ABSTRACT

A diagnosis device diagnoses a cooler adapted to cool a fluid flowing through intake and exhaust systems of an engine, and includes: a downstream temperature sensor for detecting a fluid temperature downstream of the cooler; a fluid temperature calculation unit for calculating a fluid temperature upstream of the cooler based on a fluid state quantity; a sensor output value calculation unit for assuming an upstream temperature sensor configured to detect a fluid temperature upstream of the cooler, reflecting a sensor response delay in the calculated fluid temperature, and calculating an estimated sensor output value of the upstream temperature sensor; and a cooler diagnosis unit for diagnosing the cooling efficiency of the cooler based on an actual sensor input value entered from the downstream temperature sensor and the calculated estimated sensor output value.

11 Claims, 4 Drawing Sheets

(51) Int. Cl.
*F02M 26/05* (2016.01)
*F02M 26/49* (2016.01)
*F02M 26/22* (2016.01)
*F02M 35/10* (2006.01)
*F02M 26/47* (2016.01)
*F02D 41/22* (2006.01)
*F02D 41/00* (2006.01)

(52) U.S. Cl.
CPC ............ *F02M 26/47* (2016.02); *F02M 26/49* (2016.02); *F02M 35/1038* (2013.01); *F02D 41/22* (2013.01); *F02D 2041/0067* (2013.01); *F02D 2200/0414* (2013.01); *F02D 2200/0416* (2013.01); *Y02T 10/146* (2013.01)

(56) References Cited

U.S. PATENT DOCUMENTS

| | | | | |
|---|---|---|---|---|
| 2012/0137680 | A1* | 6/2012 | Nam | F02M 26/47 60/605.2 |
| 2012/0290193 | A1* | 11/2012 | Suzuki | F02D 13/0261 701/103 |
| 2013/0199178 | A1* | 8/2013 | Kanou | F01K 7/22 60/605.2 |
| 2014/0321499 | A1* | 10/2014 | Nakano | G01K 15/007 374/1 |
| 2015/0142338 | A1* | 5/2015 | Nakano | F02D 41/0065 702/35 |
| 2016/0160777 | A1* | 6/2016 | Hanawa | F02D 41/1446 374/144 |
| 2016/0169168 | A1* | 6/2016 | Hanawa | F02D 41/144 123/568.12 |

OTHER PUBLICATIONS

Japan Platform for Patent Information, English Abstract of Japanese Publication No. 2013-108414 published Jun. 6, 2013.
International Search Report dated Sep. 16, 2014 in corresponding International Application No. PCT/JP2014/070196.
International Preliminary Report on Patentability dated Feb. 2, 2016 in corresponding International Patent Application No. PCT/JP2014/070196.

* cited by examiner

DIAGNOSIS DEVICE

CROSS-REFERENCE TO RELATED APPLICATIONS

This application is a U.S. National Stage Application, which claims the benefit under 35 U.S.C. § 371 of PCT International Patent Application No. PCT/JP2014/070196, filed Jul. 31, 2014, which claims the foreign priority benefit under 35 U.S.C. § 119 of Japanese Patent Application No. 2013-159117, filed Jul. 31, 2013, the contents of which are incorporated herein by reference.

TECHNICAL FIELD

The present invention relates to a diagnosis device, and in particular to a diagnosis device for a cooler arranged in an intake and exhaust system of an engine.

BACKGROUND ART

As a cooler arranged in an intake system (intake air passage) of an engine, an intercooler to cool an intake air to be introduced into the engine, for example, is known. As a cooler arranged in an exhaust system (exhaust gas passage) of the engine, an EGR cooler disposed in an exhaust gas recirculation system (hereinafter referred to as "EGR system") adapted to partially recirculate an exhaust gas into the intake system, for example, is known.

A significant reduction in cooling efficiency of these coolers may affect an engine performance. Accordingly, a technique of arranging a temperature sensor on a downstream side of the cooler, calculating the temperature of a fluid on an upstream side of the cooler based on, for example, a state quantity of the fluid, and then comparing a value obtained by the sensor to the calculated value to diagnose the cooling efficiency of the cooler has been proposed (see, for example, Patent Literature Documents 1 and 2).

LISTING OF REFERENCES

Patent Literature Document 1: Japanese Patent Application Laid-Open Publication No. 2013-108416
Patent Literature Document 2: Japanese Patent Application Laid-Open Publication No. 2013-108414.

If a diagnostic method calculates the temperature of a fluid on the upstream side of the cooler and compares the calculated fluid temperature to a value obtained by the sensor on the downstream side of the cooler, then the calculated value which does not involve a response delay of the sensor and an actual sensor value which involves a response delay are compared to each other. This may cause an inaccurate diagnosis. If temperature sensors are arranged on both the upstream and downstream sides of the cooler for easier comparison, this leads to an increased cost of the diagnosis device as a whole due to an increased number of sensors.

SUMMARY OF THE INVENTION

An object of the present invention is to provide a diagnosis device which is capable of carrying out an effective diagnosis of a cooler without a temperature sensor being arranged on the upstream side of the cooler.

A diagnosis device disclosed herein is directed to a diagnosis device for a cooler. The cooler is adapted to cool a fluid flowing in an intake and exhaust system of an engine. The diagnosis device includes a downstream temperature sensor that detects a temperature of the fluid on a downstream side of the cooler, a fluid temperature calculation unit that calculates a temperature of the fluid on an upstream side of the cooler on the basis of at least a state quantity of the fluid, a sensor output value calculation unit that assumes an upstream temperature sensor configured to detect the temperature of the fluid on the upstream side of the cooler, and reflects a response delay of a sensor in the temperature of the fluid calculated by the fluid temperature calculation unit to calculate an estimated sensor output value of the upstream temperature sensor, and a cooler diagnosis unit that diagnoses a cooling efficiency of the cooler on the basis of an actual sensor input value entered from the downstream temperature sensor and the estimated sensor output value calculated by the sensor output value calculation unit.

A diagnosis device disclosed herein is capable of carrying out an effective diagnosis of a cooler without a temperature sensor being arranged on an upstream side of the cooler.

DETAILED DESCRIPTION

Hereinafter, diagnosis devices according to embodiments of the present invention will be described with reference to the accompanying drawings. Same parts are designated by same reference numerals, and such same parts have same names and functions. Accordingly, redundant detailed descriptions of such parts will be omitted.

First Embodiment

Figure 1:
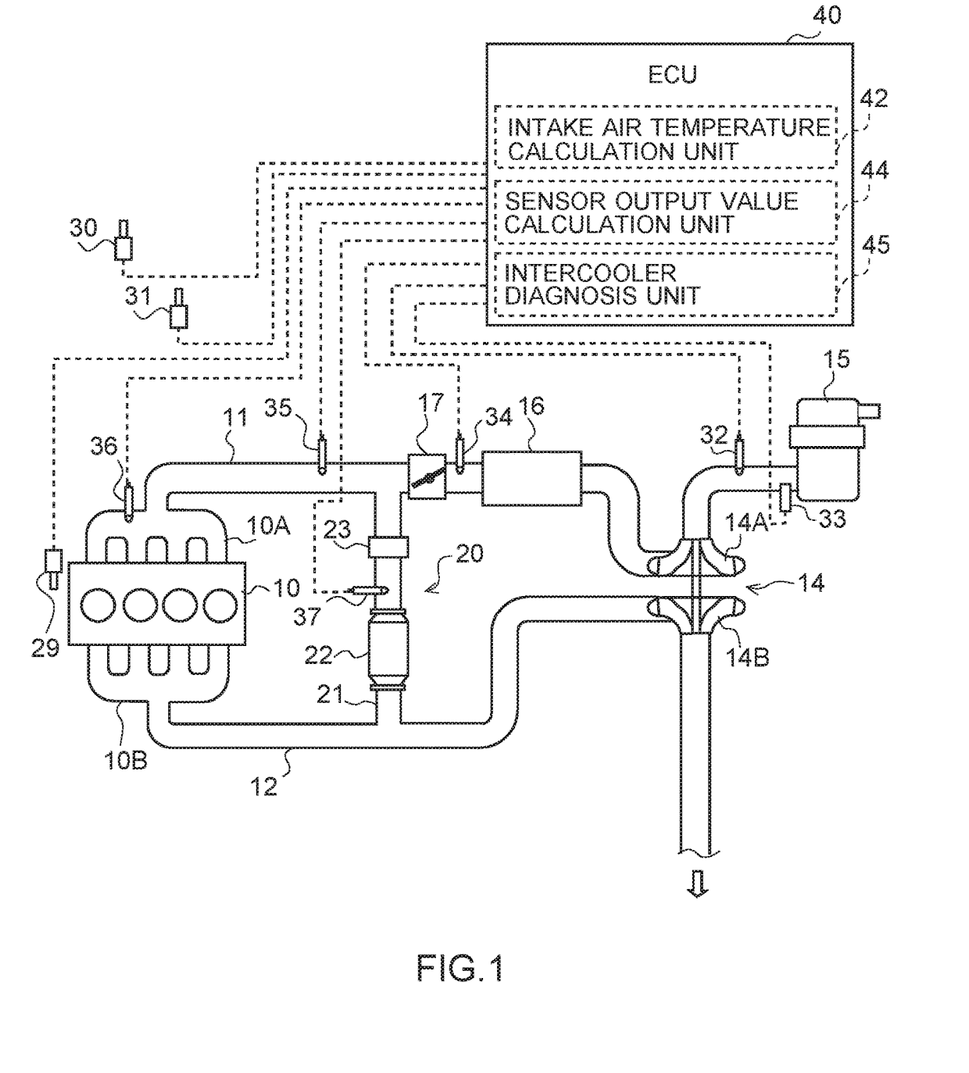
FIG. 1 is a schematic overall configuration diagram of a diagnosis device according to a first embodiment of the present invention.

Referring to FIG. 1, a diesel engine (hereinafter simply referred to as "engine") 10 is has an intake manifold 10A and an exhaust manifold 10B. An intake passage (intake pipe) 11 for introducing a fresh air is connected to the intake manifold 10A, and an exhaust passage (exhaust pipe) 12 for discharging an exhaust gas to the atmosphere is connected to the exhaust manifold 10B.

On the exhaust passage 12, disposed are a turbine 14B of a turbo charger 14, an exhaust gas aftertreatment device (not shown), and other elements. The turbine 14B is arranged upstream of the exhaust gas aftertreatment device. On the intake passage 11, disposed are an air cleaner 15, an intake air flow sensor 33, an intake air temperature sensor 32, a compressor 14A of the turbo charger 14, an intercooler 16, a cooler outlet intake air temperature sensor 34, a throttle valve 17, an intake air oxygen concentration sensor 35, and a boost pressure sensor 36. The air cleaner 15, the intake air flow sensor 33, the intake air temperature sensor 32, the compressor 14A, the intercooler 16, the cooler outlet intake air temperature sensor 34, the throttle valve 17, the intake air oxygen concentration sensor 35, and the boost pressure sensor 36 are arranged in this order from the upstream side.

Sensor values obtained (detected) by the respective sensors 32 to 36 are supplied to an electronic control unit (hereinafter referred to as "ECU") 40, which is electrically connected to the sensors 32 to 36. It should be noted that the cooler outlet intake air temperature sensor 34 is an example of a downstream temperature sensor according to the present invention.

An engine rotation speed sensor 29 detects the rotation (revolution) speed of a crankshaft (not shown). An accelerator opening degree sensor 30 detects an accelerator opening degree, which corresponds to a depressed amount of an accelerator pedal (not shown). An atmospheric pressure sensor 31 is installed in a vehicle (not shown), and detects an atmospheric pressure. Sensor values obtained by these sensors 29 to 31 are supplied to the ECU 40, which is electrically connected to the sensors 29 to 31.

The ECU 40 performs various types of control, such as control over fuel injection for the engine 10, and includes a CPU, a ROM, a RAM, input ports, output ports, and other elements which are known in the art. In addition, the ECU 40 includes an intake air temperature calculation unit 42, a sensor output value calculation unit 44, and an intercooler diagnosis unit 45 as functional components thereof. It is assumed in the following description that all of these functional components are included in the ECU 40, which is a single piece of hardware, but one or more of these functional components may be included in a separate piece of hardware.

The intake air temperature calculation unit 42 is an example of a fluid temperature calculation unit according to the present invention, and calculates the temperature of the intake air on an upstream side of the intercooler 16, i.e., between the compressor 14A and the intercooler 16, (hereinafter referred to as "cooler inlet intake air temperature") $T_2$ on the basis of a state quantity of the intake air and other factors. More specifically, the ECU 40 stores the expression (1), where $T_2$ is the cooler inlet intake air temperature, $T_1$ is a compressor inlet intake air temperature, $P_1$ is a compressor inlet intake air pressure, $P_2$ is a compressor outlet intake air pressure, and k is the specific heat ratio of the intake air.

$$T_2 = \left(\frac{P_2}{P_1}\right)^{\frac{k-1}{k}} \cdot T_1 \quad \text{[Math. 1]}$$

The intake air temperature calculation unit 42 substitutes in the expression (1) the compressor inlet intake air temperature $T_1$, which is detected by the intake air temperature sensor 32, the compressor inlet intake air pressure $P_1$, which is detected by the atmospheric pressure sensor 31, and the compressor outlet intake air pressure $P_2$, which is detected by the boost pressure sensor 36, to calculate the cooler inlet intake air temperature $T_2$ in real time.

It should be noted that the cooler inlet intake air temperature $T_2$ may not necessarily be calculated using the expression (1), but may be calculated on the basis of, for example, the expression (2), where $T_2$ is the cooler inlet intake air temperature, $T_1$ is the compressor inlet intake air temperature, $P_1$ is the compressor inlet intake air pressure, $P_2$ is the compressor outlet intake air pressure, k is the specific heat ratio, and $\eta_{com}$ is a compressor efficiency.

$$T_2 = T_1 + \frac{T_1 \cdot (P_2/P_1)^{\frac{k-1}{k}}}{\eta_{com}} \quad \text{[Math. 2]}$$

In the expression (2), the compressor inlet intake air temperature $T_1$ is detected by the intake air temperature sensor 32, the compressor inlet intake air pressure $P_1$ is detected by the atmospheric pressure sensor 31, and the compressor outlet intake air pressure $P_2$ is detected by the boost pressure sensor 36. The compressor efficiency $\eta_{com}$ is obtained from a performance data map of the turbo charger 14, which is stored in advance in the ECU 40.

The sensor output value calculation unit 44 is an example of a sensor output value calculation unit according to the present invention, and assumes a virtual upstream intake air temperature sensor (hereinafter referred to as "virtual intake air temperature sensor") between the compressor 14A and the intercooler 16. The sensor output value calculation unit 44 reflects a sensor response delay into the cooler inlet intake air temperature $T_2$, which is calculated by the intake air temperature calculation unit 42, using a second-order low pass filter (LPF) to calculate an estimated sensor output value $T_{est}$ of the virtual intake air temperature sensor. A detailed procedure of this calculation will be described below.

The time constant of a temperature sensor is not constant because it depends on the flow rate of a fluid and other factors. It is therefore necessary to derive a dependence relation between the time constant and physical quantities from physical formulas. Assuming that a thermal energy transferred from the fluid to an outer wall surface of the temperature sensor or to an inner wall surface of the intake pipe is equal to an energy required for a change in the temperature of the wall surface, a heat transfer equation is given by the expression (3), where $\rho_w$ is the density of a solid, $c_p$ is the specific heat of the solid, $V_w$ is the volume of the solid, $T_s$ is the wall surface temperature, h is a heat transfer coefficient, S is a heat transfer surface area, and $T_f$ is the temperature of the fluid.

$$\rho_w c_p V_w \frac{dT_s}{dt} = -hS(T_s - T_f) \quad \text{[Math. 3]}$$

Subjecting the expression (3) to a Laplace transform gives the expression (4).

$$\frac{T_s}{T_f} = \frac{1}{\tau \cdot S + 1} \text{ where } \tau = \frac{K}{h}, K = \frac{\rho_w c_p V_w}{S} \quad \text{[Math. 4]}$$

It is apparent from the expression (4) that the time constant for temperature change is inversely proportional to the heat transfer coefficient h between the fluid and the wall surface.

In this embodiment, the relation between physical quantities and the heat transfer coefficient of the temperature sensor is firstly taken into consideration. For example, assuming that the fluid flows in a uniform manner and the sensor has a substantially columnar shape, the average heat transfer coefficient of the columnar sensor placed in the uniform flow is expressed by the expression (5), where Nu is the Nusselt number, Re is the Reynolds number, Pr is the Prandtl number, and C is a constant, on the basis of a known empirical formula for the heat transfer coefficient.

$$Nu = \left(\frac{hl}{\lambda}\right) = C \cdot Re^{n1} \cdot Pr^{n2} \quad \text{[Math. 5]}$$

Solving the expression (5) with respect to the heat transfer coefficient h, making various assumptions and approximations, and extracting the fluid temperature $T_f$ and a mass flow rate $m_f$ gives the expression (6).

$$h = C' \cdot T_f^{n3} \cdot m_f^{n1} = C'' \cdot \left(\frac{T_f}{T_{f0}}\right)^{n3} \cdot \left(\frac{m_f}{m_{f0}}\right)^{n1} \quad [\text{Math. 6}]$$

Substituting the expression (6) into the expression (4) gives the expression (7). A temperature change time constant $\tau_1$ of the temperature sensor is proportional to both the fluid temperature $T_f$ and the mass flow rate $m_f$. It should be noted that in the expression (7) $T_{f0}$ represents a reference value of the fluid temperature, and $m_{f0}$ represents a reference value of the mass flow rate.

$$\frac{T_{s1}}{T_f} = \frac{1}{\tau \cdot S + 1} \quad [\text{Math. 7}]$$

$$\text{where } \tau_1 = \frac{K}{h} = \tau_0 \cdot \left(\frac{T_f}{T_{f0}}\right)^{-n3} \cdot \left(\frac{m_f'}{m_{f0}'}\right)^{-n1}$$

Next, in this embodiment, the relation between physical quantities and the heat transfer coefficient of the intake passage (intake pipe) 11 is taken into consideration. Assuming that the intake passage 11 is formed by a smooth cylindrical tube, the average heat transfer coefficient inside the circular tube is expressed by the expression (8) on the basis of a known empirical formula.

$$Nu = \left(\frac{hl}{\lambda}\right) = C \cdot Re^{n4} \cdot Pr^{n5} \quad [\text{Math. 8}]$$

If the rearrangement similar to that of the expression (7) is applied to the expression (8), a proportional relation between a temperature change time constant $\tau_2$ of the intake pipe and the physical quantities (fluid temperature $T_f$ and the mass flow rate $m_f$) is expressed by the expression (9).

$$\frac{T_{s2}}{T_f} = \frac{1}{\tau_2 \cdot S + 1} \quad [\text{Math. 9}]$$

$$\text{where } \tau_2 = \frac{K}{h} = \tau_0 \cdot \left(\frac{T_f}{T_{f0}}\right)^{-n6} \cdot \left(\frac{m_f'}{m_{f0}'}\right)^{-n4}$$

In this embodiment, the relation between the estimated sensor output value $T_{est}$ of the temperature sensor and the temperature of the wall surface of the intake passage (intake pipe) 11 is also taken into consideration. Assuming that the estimated sensor output value $T_{est}$ be a value between a sensor wall surface temperature $T_{s1}$ and an intake pipe temperature $T_{s2}$, the estimated sensor output value $T_{est}$ can be expressed by the expression (10), where $\alpha$ is a weighting coefficient.

$$T_{est} = (1-\alpha) \cdot T_{s1} + \alpha \cdot T_{s2} \quad [\text{Math. 10}]$$

where $0 < \alpha < 1$

Assuming that the sensor wall surface temperature $T_{s1}$ and the intake pipe temperature $T_{s2}$ have separate time constants and vary in accordance with the expression (7) or (9), a transfer function representing a variation in the estimated sensor output value $T_{est}$ is expressed by the expression (11) (a model formula) with a second-order LPF being used.

$$\frac{T_{est}}{T_f} = (1-\alpha) \cdot \frac{T_{s1}}{T_f} + \alpha \cdot \frac{T_{s2}}{T_f} \quad [\text{Math. 11}]$$

$$= \frac{1-\alpha}{\tau_1 \cdot S + 1} + \frac{\alpha}{\tau_2 \cdot S + 1}$$

$$\text{where } \tau_1 = \tau_{10} \cdot \left(\frac{T_f}{T_{f0}}\right)^{-n3} \cdot \left(\frac{m_f'}{m_{f0}'}\right)^{-n1}$$

$$\tau_2 = \tau_{20} \cdot \left(\frac{T_f}{T_{f0}}\right)^{-n6} \cdot \left(\frac{m_f'}{m_{f0}'}\right)^{-n4}$$

The sensor output value calculation unit 44 substitutes the cooler inlet intake air temperature $T_2$, which is calculated by the intake air temperature calculation unit 42, for the fluid temperature $T_f$ in the expression (11) to calculate the estimated sensor output value $T_{est}$ of the virtual intake air temperature sensor. Thus, the estimated sensor output value $T_{est}$, which reflects the sensor response delay, is calculated in real time on the basis of the cooler inlet intake air temperature $T_2$, which varies in accordance with the running condition of the engine 10.

The intercooler diagnosis unit 45 is an example of a cooler diagnosis unit according to the present invention, and diagnoses a cooling efficiency of the intercooler 16 on the basis of an actual sensor input value $T_{act}$ entered from the cooler outlet intake air temperature sensor 34 and the estimated sensor output value $T_{est}$ calculated by the sensor output value calculation unit 44.

More specifically, the ECU 40 stores a lower limit threshold value $\eta_{min}$ of the cooling efficiency, which is prepared in advance on the basis of experiments or the like, to indicate a fault of the intercooler 16. Here, the "fault" refers to, for example, a condition in which a significant degradation is observed in heat exchange between the intake air and a coolant due to a deterioration of a part of the intercooler, adhesion of a foreign substance contained in the intake air to the intercooler or the like. The intercooler diagnosis unit 45 determines that a fault has occurred in the intercooler 16 when the cooling efficiency $\eta_{IC}$, which is calculated on the basis of the estimated sensor output value $T_{est}$ and the actual sensor input value $T_{act}$, becomes lower than the lower limit threshold value $\eta_{min}$. It should be noted that the cooling efficiency $\eta_{IC}$ may be calculated by the expression (12).

$$\eta_{IC} = \frac{T_{est} - T_{act}}{T_{est} - T_l} \quad [\text{Math. 12}]$$

Figure 2:
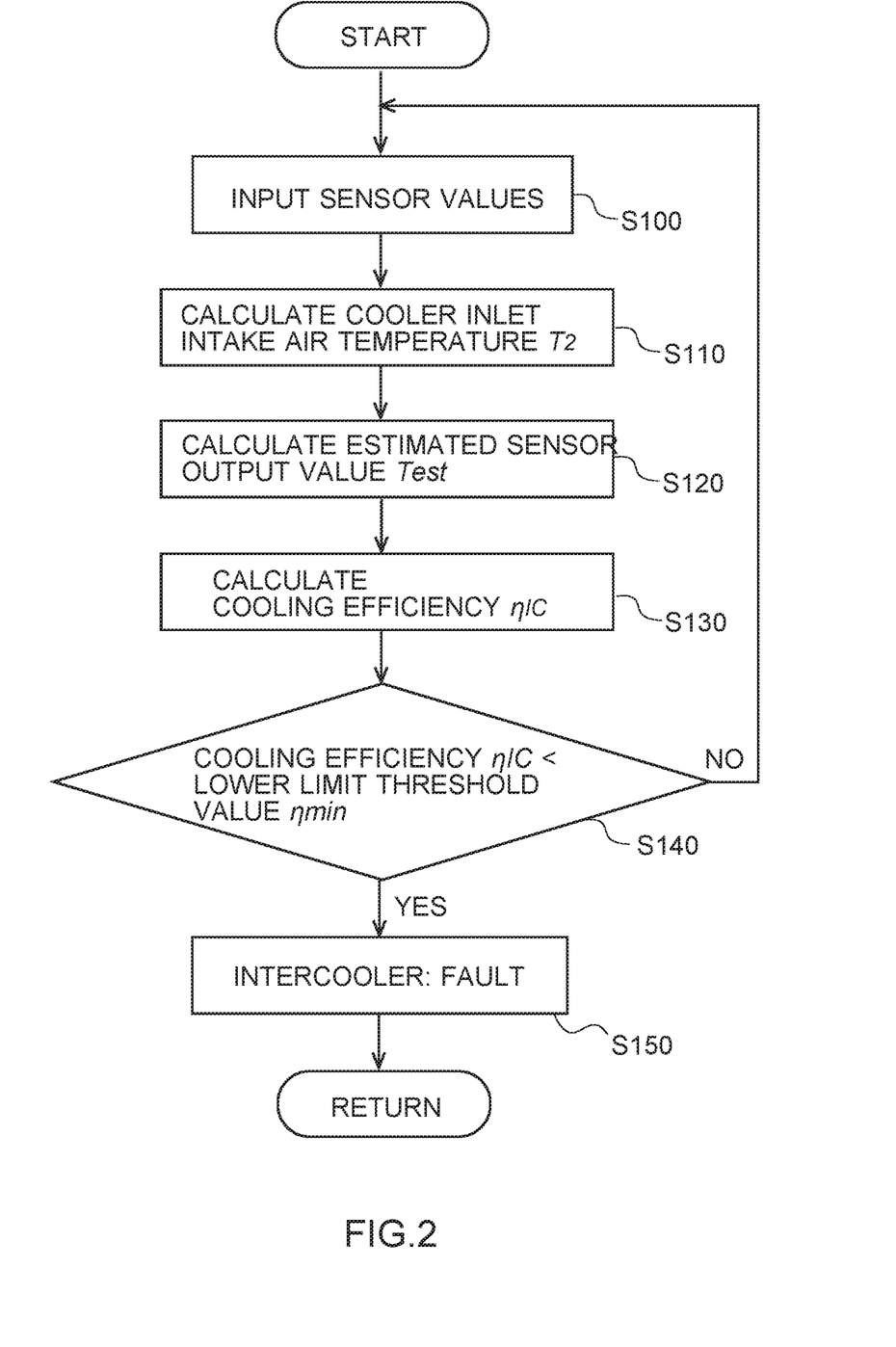
FIG. 2 is a flowchart illustrating control performed by the diagnosis device according to the first embodiment of the present invention.

Next, a control flow of a diagnosis device according to this embodiment will be described with reference to FIG. 2.

Firstly, in Step S100, the sensor values of the various sensors 29 to 36 are supplied to the ECU 40 upon turning on of an ignition key.

In Step S110, the cooler inlet intake air temperature $T_2$ is calculated on the basis of the expression (1) or (2). In Step S120, the estimated sensor output value $T_{est}$ of the virtual intake air temperature sensor is calculated on the basis of the cooler inlet intake air temperature $T_2$ using the model formula of the expression (11), which reflects the response delay of the sensor.

In Step S130, the cooling efficiency $\eta_{IC}$ of the intercooler 16 is calculated on the basis of the actual sensor input value $T_{act}$, which is entered from the cooler outlet intake air temperature sensor 34, and the estimated sensor output value $T_{est}$, which is calculated in Step S120.

In Step S140, the cooling efficiency $\eta_{IC}$ and the lower limit threshold value $\eta_{min}$ are compared to each other to diagnose the intercooler 16. If the cooling efficiency $\eta_{IC}$ is lower than the lower limit threshold value $\eta_{min}$ (YES), it is determined in Step S150 that a fault has occurred in the intercooler 16. On the other hand, if the cooling efficiency $\eta_{IC}$ is equal to or greater than the lower limit threshold value $\eta_{min}$ (NO), the control returns to Step S100. Thereafter, Steps S100 to S150 are repeatedly performed until the ignition key is turned off.

Next, beneficial effects of the diagnosis device according to this embodiment will be described.

Conventionally, the temperature of the intake air on the downstream side of the intercooler is detected by an intake air temperature sensor, the temperature of the intake air on the upstream side of the intercooler is calculated on the basis of, for example, a state quantity of the intake air, and then the sensor value and the calculated value are compared to each other to diagnose the cooling efficiency of the intercooler. However, this is a comparison between the calculated value which does not involve a response delay of the sensor and the actual sensor value which involves a response delay, and may therefore provide an inaccurate diagnosis especially during a transient operation. If one intake air temperature sensor is arranged on the upstream side of the intercooler and another intake air temperature sensor is arranged on the downstream side of the intercooler for easier comparison, a cost of the entire device increases due to an increased number of sensors.

In contrast, the diagnosis device according to this embodiment calculates the estimated sensor output value $T_{est}$ of the virtual intake air temperature sensor in real time using the expression (11), which reflects the response delay of the sensor. The expression (11) is configured as a second-order LPF which includes the relation between the temperature change time constant $\tau_1$ of the intake air temperature sensor and the physical quantities (exhaust gas flow rate $m_f$ and an exhaust gas temperature $T_f$) and the relation between the temperature change time constant $\tau_2$ of the intake passage (intake pipe) 11 and the physical quantities (exhaust gas flow rate $m_f$ and the exhaust gas temperature $T_f$) to precisely reflect the response delay of the sensor. Such second-order LPF enables precise calculation of the estimated sensor output value $T_{est}$ of the virtual intake air temperature sensor, which reflects the response delay of the sensor, over the entire operating range, including the transient operation, of the engine 10.

Accordingly, the diagnosis device according to this embodiment can dispense with the intake air temperature sensor on the upstream side of the intercooler 16 and effectively minimize an increase in the cost of the device as a whole. In addition, the diagnosis device of this embodiment is able to calculate the estimated sensor output value $T_{est}$, which reflects the response delay of the sensor, in real time, and more precisely diagnose the cooling efficiency of the intercooler 16 over a wide operating range including the transient operation than a conventional technique that simply compares the calculated value and the sensor value to each other.

Second Embodiment

Figure 3:
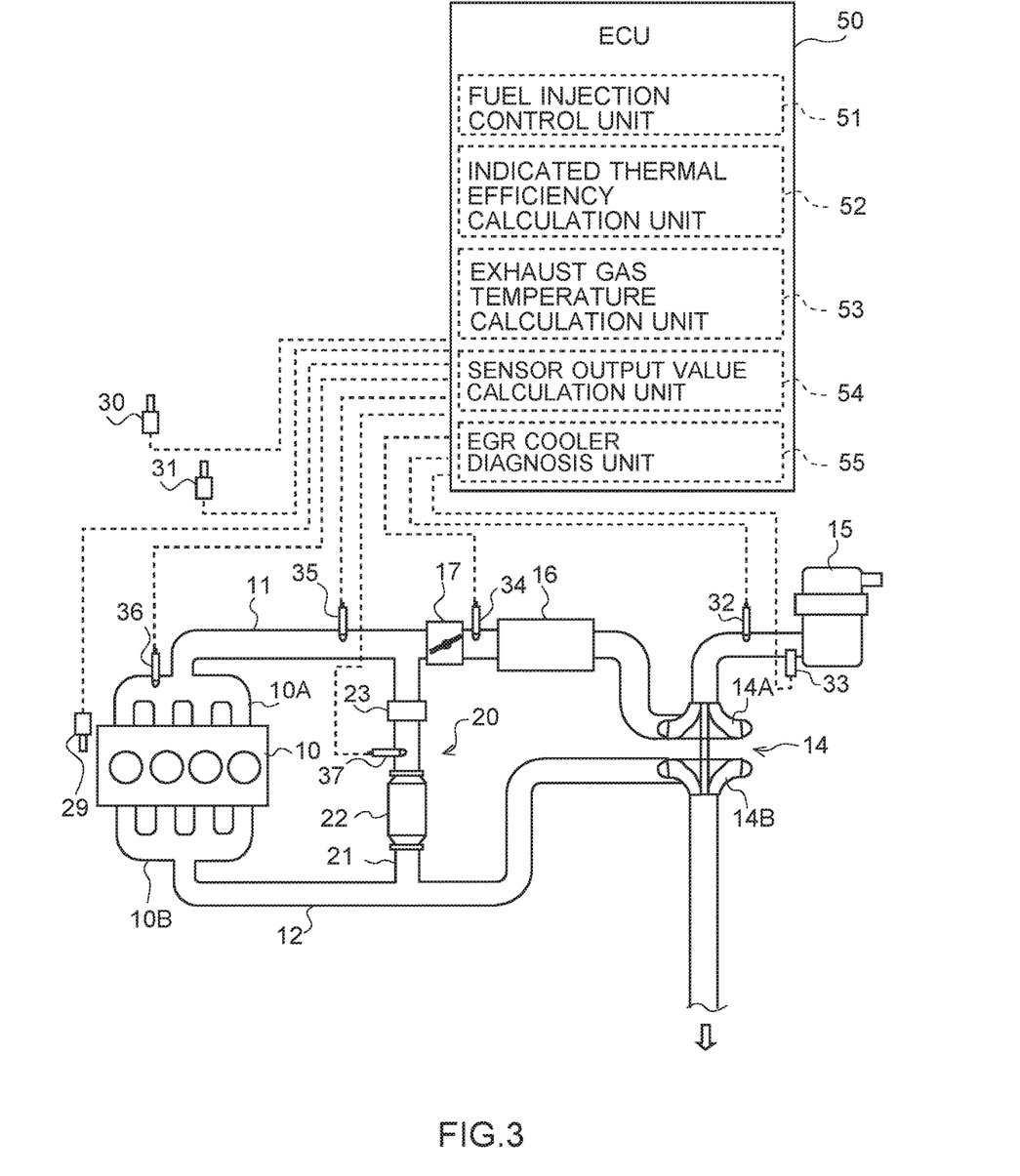
FIG. 3 is a schematic overall configuration diagram of a diagnosis device according to a second embodiment of the present invention.
Figure 4:
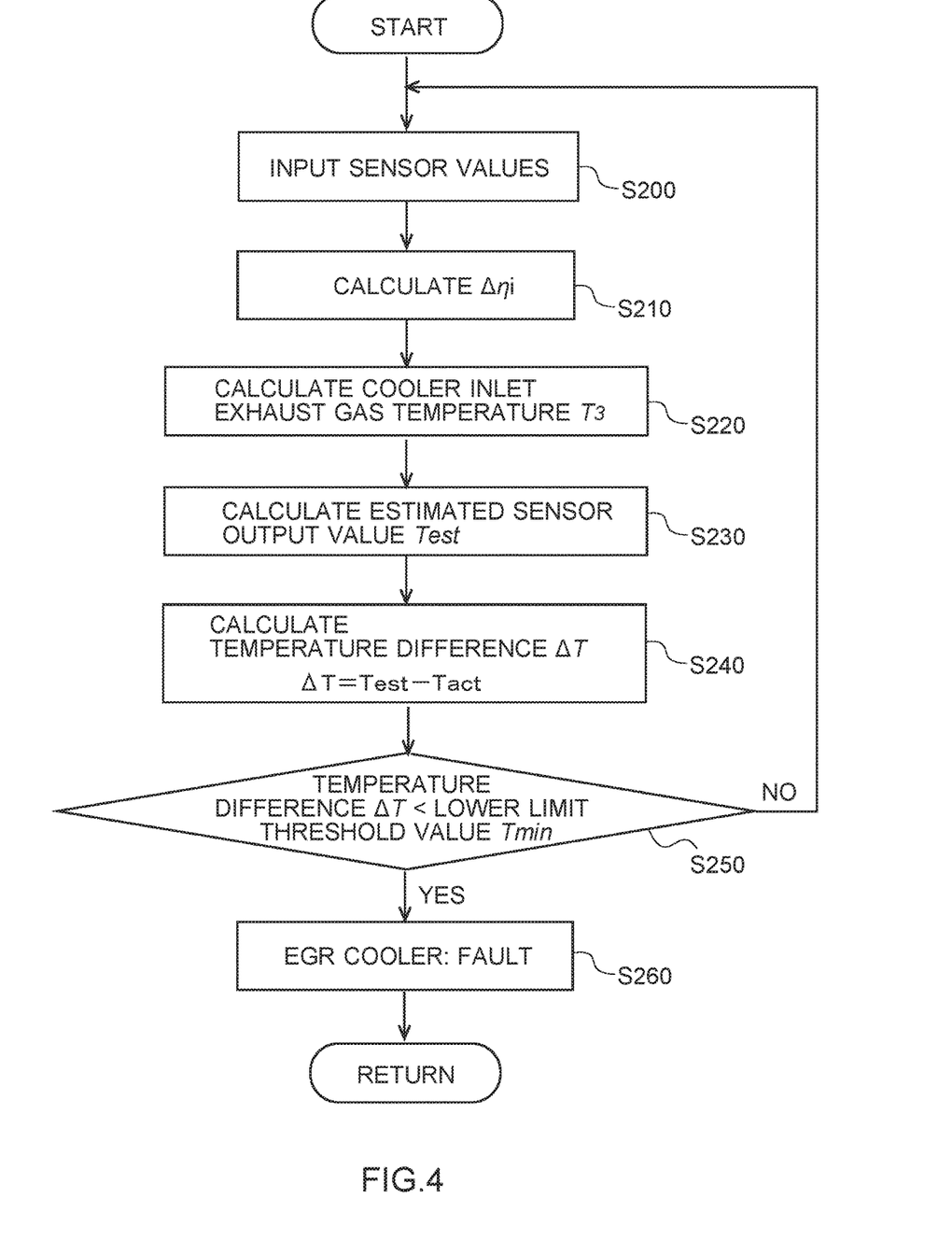
FIG. 4 is a flowchart illustrating control performed by the diagnosis device according to the second embodiment of the present invention.

Hereinafter, a diagnosis device according to a second embodiment of the present invention will be described with reference to FIGS. 3 and 4. The second embodiment of the present invention is applied to diagnosis of an EGR cooler 22. Components that have the same functions as those of their equivalents in the first embodiment are designated by the same reference numerals as those of their equivalents in the first embodiment, and detailed descriptions of those components will be omitted.

An EGR system 20 includes an EGR passage 21 for recirculating a portion of the exhaust gas into an intake system, the EGR cooler 22 for cooling an EGR gas, and an EGR valve 23 for regulating the flow rate of the EGR gas. A cooler outlet exhaust gas temperature sensor 37 to detect the temperature of the EGR gas, which is cooled by the EGR cooler 22, is arranged on the EGR passage 21 at a position on the downstream (outlet) side of the EGR cooler 22. A sensor value obtained by the cooler outlet exhaust gas temperature sensor 37 is supplied to an ECU 50, which is electrically connected to the sensor 37.

The ECU 50 includes a fuel injection control unit 51, an indicated thermal efficiency calculation unit 52, an exhaust gas temperature calculation unit 53, a sensor output value calculation unit 54, and an EGR cooler diagnosis unit 55 as functional components thereof. It is assumed in the following description that all of these functional components are included in the ECU 50, which is a single piece of hardware, but one or more of these functional components may be included in a separate piece of hardware.

The fuel injection control unit 51 controls fuel injection timing and an amount of fuel injection by a fuel injection device (not shown) of an engine 10 on the basis of an engine revolution speed N entered from an engine rotation speed sensor 29 and an accelerator opening degree Q entered from an accelerator opening degree sensor 30.

The indicated thermal efficiency calculation unit 52 constitutes part of a fluid temperature calculation unit according to the present invention, and calculates an amount $\Delta\eta_i$ of change in the indicated thermal efficiency of the engine 10 on the basis of sensor values obtained from the sensors 29 to 37, equations presented below, and so on. A procedure of this calculation will now be described in detail below.

Due to energy conservation in cylinders of the engine 10, an exhaust gas energy $H_{ex}$ is expressed by the expression (13), where $H_{in}$ is an intake air energy, $Q_{fuel}$ is a combustion energy of the fuel, $U_{hloss}$ is a cooling loss energy, and $\eta_i$ is the indicated thermal efficiency of the engine 10.

$$H_{ex} = (1-\eta_i)Q_{fuel} - U_{hloss} + H_{in} \qquad \text{[Math. 13]}$$

On the basis of the expression (13), assuming that the amount of fuel injection is constant and a change in the cooling loss energy $U_{hloss}$ is only minimal, the amount $\Delta H_{ex}$ of change from a reference exhaust gas energy $H_{ex,ref}$ is approximated by the expression (14).

$$\Delta H_{ex} \approx H_{in} - H_{in,ref} - \Delta\eta_i \cdot Q_{fuel} \qquad \text{[Math. 14]}$$

The temperature of that portion of the exhaust gas which is discharged from the engine 10 and reaches an inlet of the EGR cooler 22 (hereinafter referred to as "cooler inlet exhaust gas temperature") $T_3$ is expressed by the expression (15).

$$T_3 = \frac{1}{C_{p,ex} \cdot m_{ex}}(H_{ex,ref} + \Delta H_{ex}) \qquad \text{[Math. 15]}$$

where $H_{ex} = C_{p,ex}T_3 m_{ex}$

With the expression (14) being substituted into the expression (15), the cooler inlet exhaust gas temperature $T_3$ is expressed by the expression (16), where $C_{p,in}$ is the specific heat of the intake air at constant pressure, $m_{ex}$ is an exhaust gas flow rate, $H_{ex,ref}$ is the reference exhaust gas energy, $H_{in,ref}$ is a reference intake air energy, $H_{in}$ is the exhaust gas energy, and $Q_{fuel}$ is the combustion energy.

$$T_3 = \frac{1}{c_{p,ex} \cdot m_{ex}}(H_{ex,ref} + H_{in} - H_{in,ref} - \Delta\eta_i \cdot Q_{fuel}) \quad [\text{Math. 16}]$$

As factors that cause the change in the indicated thermal efficiency $\eta_i$, a fuel injection start timing $\varphi$ and an intake air oxygen concentration $X_{O2}$ are taken into consideration. Assuming that the variation of the amount $\Delta\eta_i$ of change in the indicated thermal efficiency with respect to the intake air oxygen concentration $X_{O2}$ is linear, the amount $\Delta\eta_i$ of change in the indicated thermal efficiency is, via Taylor expansion, approximated by the expression (17), where $X_{O2}$ is the intake air oxygen concentration, $\varphi$ is the fuel injection start timing, $k_{1,O2}$ is an intake air oxygen concentration correction coefficient, $X_{O2,ref}$ is a reference intake air oxygen concentration, $k_{n(n=1,2),soi}$ is a fuel injection start timing correction coefficient, and $\varphi_{ref}$ is a reference fuel injection start timing.

$$\Delta\eta_i = \eta_i - \eta_{i,ref} \approx k_{1,soi} \cdot (\phi - \phi_{ref}) + k_{1,o_2} \cdot (x_{o_2} - x_{o_2,ref}) + \quad [\text{Math. 17}]$$
$$k_{2,soi} \cdot (\phi - \phi_{ref})^2 + k_{2,soi \cdot o2} \cdot (\phi - \phi_{ref}) \cdot (x_{o_2} - x_{o_2,ref})$$

Assuming that an influence of a change in the intake air oxygen concentration $X_{O2}$ on the injection start timing $\varphi$ is minimal in the expression (17), the amount $\Delta\eta_i$ of change in the indicated thermal efficiency is expressed by the expression (17).

$$\Delta\eta_i = k_{1,soi} \cdot (\varphi - \varphi_{ref}) + k_{1,o_2} \cdot (x_{o_2} - x_{o_2,ref}) + k_{2,soi} \cdot (\varphi - \varphi_{ref})^2 \quad [\text{Math. 18}]$$

The indicated thermal efficiency calculation unit 52 calculates the amount $\Delta\eta_i$ of change in the indicated thermal efficiency in real time on the basis of the expression (18). More specifically, the ECU 50 stores a correction value map (not shown) which defines the relation among the engine revolution speed N, the accelerator opening degree Q, and the intake air oxygen concentration correction coefficient $k_{1,O2}$, and also stores a reference value map (not shown) which defines the relation among the engine revolution speed N, the accelerator opening degree Q, and the reference intake air oxygen concentration $X_{O2,ref}$. These maps are prepared in advance on the basis of experiments or the like. The ECU 50 further stores a correction value map (not shown) which defines the relation among the engine revolution speed N, the accelerator opening degree Q, and the injection start timing correction coefficient $k_{n(n=1,2),soi}$, and a reference value map (not shown) which defines the relation among the engine revolution speed N, the accelerator opening degree Q, and the reference injection start timing $\varphi_{ref}$. These maps are prepared in advance on the basis of experiments or the like.

The indicated thermal efficiency calculation unit 52 reads appropriate values from these maps in accordance with the running condition of the engine 10 and substitutes the values into the expression (18), and also substitutes the intake air oxygen concentration $X_{O2}$, which is entered from an intake air oxygen concentration sensor 35, and the injection start timing $\varphi$, which is determined by the fuel injection control unit 51, into the expression (18). Thus, the amount $\Delta\eta_i$ of change in the indicated thermal efficiency, which reflects an amount of change from the reference intake air oxygen concentration $X_{O2,ref}$ and an amount of change from the reference injection start timing $\varphi_{ref}$, is calculated in real time.

The exhaust gas temperature calculation unit 53 constitutes part of the fluid temperature calculation unit according to the present invention, and calculates the cooler inlet exhaust gas temperature $T_3$ in real time on the basis of the expression (16). More specifically, the ECU 50 stores a reference value map (not shown) which indicates the relation among the engine revolution speed N, the accelerator opening degree Q, and the reference intake air energy $H_{in,ref}$, and also stores a reference value map (not shown) which indicates the relation among the engine revolution speed N, the accelerator opening degree Q, and the reference exhaust gas energy $H_{ex,ref}$. These maps are prepared in advance on the basis of experiments or the like.

The exhaust gas temperature calculation unit 53 substitutes appropriate values, which are read from these maps in accordance with the running condition of the engine 10, the intake air energy $H_{in}$, which is calculated on the basis of, for example, a state quantity of the intake air, and the combustion energy $Q_{fuel}$, which is calculated on the basis of a lower heating value of the fuel, the amount of fuel injection, and/or the like, into the expression (16) to calculate the cooler inlet exhaust gas temperature $T_3$ in real time.

The sensor output value calculation unit 54 is an example of the sensor output value calculation unit according to the present invention, and assumes a virtual upstream exhaust gas temperature sensor (hereinafter referred to as "virtual exhaust gas temperature sensor") on the upstream side of the EGR cooler 22. The sensor output value calculation unit 54 uses a second-order LPF to reflect a response delay of the sensor in the cooler inlet exhaust gas temperature $T_3$, which is calculated by the exhaust gas temperature calculation unit 53, to calculate an estimated sensor output value $T_{est}$ of the virtual exhaust gas temperature sensor.

More specifically, the ECU 50 stores the expression (11) used in the first embodiment. The sensor output value calculation unit 54 substitutes the cooler inlet exhaust gas temperature $T_3$, which is calculated by the exhaust gas temperature calculation unit 53, for the fluid temperature $T_f$ in the expression (11) to calculate the estimated sensor output value $T_{est}$ of the virtual exhaust gas temperature sensor. Thus, the estimated sensor output value $T_{est}$, which reflects the response delay of the sensor, is calculated in real time on the basis of the cooler inlet exhaust gas temperature $T_3$, which varies in accordance with the running condition of the engine 10.

The EGR cooler diagnosis unit 55 is an example of the cooler diagnosis unit according to the present invention, and diagnoses a cooling efficiency of the EGR cooler 22 on the basis of an actual sensor input value $T_{act}$ entered from the cooler outlet exhaust gas temperature sensor 37 and the estimated sensor output value $T_{est}$ calculated by the sensor output value calculation unit 54.

More specifically, the ECU 50 stores a lower limit threshold value $T_{min}$ of a temperature difference that indicates a fault of the EGR cooler 22. The lower limit threshold value $T_{min}$ is obtained in advance on the basis of an experiment or the like. Here, the "fault" refers to, for example, a condition in which a significant degradation is observed in heat exchange between the exhaust gas and a coolant due to a deterioration of a part, an adhesion of, for example, soot contained in the exhaust gas to the EGR cooler, or the like. The EGR cooler diagnosis unit 55 calculates the temperature difference $\Delta T$ between the estimated sensor output value $T_{est}$ and the actual sensor input value $T_{act}$, and determines that a fault has occurred in the EGR cooler 22 when the temperature difference $\Delta T$ becomes lower (smaller) than the lower limit threshold value $T_{min}$.

Next, a control flow of the diagnosis device according to this embodiment will be described with reference to FIG. 4.

Firstly, in Step S200, the sensor values of the sensors 29 to 37 are supplied to the ECU 50 upon turning on of the ignition key.

In Step S210, the amount $\Delta \eta_i$ of change in the indicated thermal efficiency is calculated on the basis of the expression (18). In Step S220, the cooler inlet exhaust gas temperature $T_3$ is calculated on the basis of the expression (16).

In Step S230, the estimated sensor output value $T_{est}$ of the virtual exhaust gas temperature sensor is calculated on the basis of the cooler inlet exhaust gas temperature $T_3$ using the model formula of the expression (11), which reflects the response delay of the sensor.

In Step S240, the temperature difference $\Delta T$, which indicates the cooling efficiency of the EGR cooler 22, is calculated on the basis of the actual sensor input value $T_{act}$ entered from the cooler outlet exhaust gas temperature sensor 37 and the estimated sensor output value $T_{est}$ calculated in Step S230.

In Step S250, the temperature difference $\Delta T$ and the lower limit threshold value $T_{min}$ are compared to each other to diagnose the EGR cooler 22. If the temperature difference $\Delta T$ is lower (smaller) than the lower limit threshold value $T_{min}$ (YES), it is determined in Step S260 that a fault has occurred in the EGR cooler 22. On the other hand, if the temperature difference $\Delta T$ is equal to or greater than the lower limit threshold value $T_{min}$ (NO), the control returns to Step S200. Thereafter, Steps S200 to S260 are repeatedly performed until the ignition key is turned off.

Next, beneficial effects of the diagnosis device according to this embodiment will be described.

Conventionally, the temperature of the exhaust gas on the downstream side of the EGR cooler is detected by an exhaust gas temperature sensor, the temperature of the exhaust gas on the upstream side of the EGR cooler is calculated on the basis of, for example, a state quantity of the exhaust gas, and then the sensor value and the calculated value are compared to each other to diagnose the cooling efficiency of the EGR cooler. However, this is a comparison between the calculated value which does not involve a response delay of the sensor and the actual sensor value which involves a response delay, and may therefore provide an inaccurate diagnosis especially during a transient operation. If one exhaust gas temperature sensor is arranged on the upstream side of the EGR cooler and another exhaust gas temperature sensor is arranged on the downstream side of the EGR cooler for easier comparison, a problem arises, i.e., the cost of the entire device increases due to an increased number of sensors.

In contrast, the diagnosis device according to this embodiment calculates the estimated sensor output value $T_{est}$ of the virtual exhaust gas temperature sensor in real time using the expression (11), which reflects the response delay of the sensor. The expression (11) is configured as a second-order LPF which includes the relation between a temperature change time constant $\tau_1$ of the exhaust gas temperature sensor and physical quantities (exhaust gas flow rate $m_f$ and an exhaust gas temperature $T_f$) and the relation between a temperature change time constant $\tau_2$ of the exhaust passage (exhaust pipe) 12 and the physical quantities (exhaust gas flow rate $m_f$ and the exhaust gas temperature $T_f$) to precisely reflect the sensor response delay. Such second-order LPF enables precise calculation of the estimated sensor output value $T_{est}$ of the virtual exhaust gas temperature sensor, which reflects the sensor response delay, over the entire operating range, including the transient operation, of the engine 10.

Accordingly, the diagnosis device according to this embodiment can dispense with the exhaust gas temperature sensor on the upstream side of the EGR cooler 22 and effectively minimize an increase in the cost of the device as a whole. In addition, the diagnosis device according to this embodiment is able to calculate the estimated sensor output value $T_{est}$, which reflects the sensor response delay, in real time, and more precisely diagnose the cooling efficiency of the EGR cooler 22 over a wide operating range including the transient operation than a conventional technique that simply compares the calculated value to the sensor value.

It should be noted that the present invention is not limited to the above-described embodiments, and that changes and modifications may be made as appropriate without departing from the scope and spirit of the present invention.

For example, although the above-described embodiments are directed to the diagnosis of the cooling efficiency of the intercooler 16 and the EGR cooler 22, other embodiments of the present invention may be applied to, for example, diagnosis of a cooler arranged between compressors of a multi-stage turbo-charging system. In addition, the engine 10 is not limited to the diesel engine, and embodiments of the present invention can be widely applied to other engines, such as gasoline engines. All such embodiments can achieve beneficial effects similar to those of the above-described embodiments.

The invention claimed is:

1. A device for diagnosing a fault of a cooler, which fault deteriorates a performance of an engine, comprising:
a downstream temperature sensor that detects a temperature of a fluid on a downstream side of the cooler and outputs an actual sensor input value to an electronic controller,
wherein the electronic controller is configured to
store a lower limit threshold value of a cooling efficiency of the cooler,
calculate a temperature of the fluid on an upstream side of the cooler based on at least a state quantity of the fluid;
assume a virtual upstream temperature sensor configured to detect the temperature of the fluid on the upstream side of the cooler, and reflect a sensor response delay into the calculated temperature of the fluid to calculate an estimated sensor output value of the virtual upstream temperature sensor,
determine a cooling efficiency of the cooler by comparing the actual sensor input value received from the downstream temperature sensor with the calculated estimated sensor output value, and
if the determined cooling efficiency is less than the lower limit threshold value of the cooling efficiency, determine that a fault has occurred in the cooler.

2. The diagnosis device according to claim 1, wherein the estimated sensor output value is calculated based on the temperature and state quantity of the fluid on the upstream side of the cooler, and a pre-stored model formula describing a relation among a temperature change time constant of a temperature sensor, a fluid flow rate, and a fluid temperature.

3. The diagnosis device according to claim 2, wherein the model formula further includes a relation among a temperature change time constant of a flow pipe in which the fluid flows, the fluid flow rate, and the fluid temperature.

4. The diagnosis device according to claim 3, wherein the fluid is an intake air flowing in an intake pipe connected to the engine, and the cooler is an intercooler arranged on the intake pipe.

5. The diagnosis device according to claim 3, wherein the fluid is a recirculated exhaust gas which is discharged from the engine and recirculated into the intake system, and the cooler is a recirculated exhaust gas cooler configured to cool the recirculated exhaust gas.

6. The diagnosis device according to claim 2, wherein the fluid is an intake air flowing in an intake pipe connected to the engine, and the cooler is an intercooler arranged on the intake pipe.

7. The diagnosis device according to claim 2, wherein the fluid is a recirculated exhaust gas which is discharged from the engine and recirculated into the intake system, and the cooler is a recirculated exhaust gas cooler configured to cool the recirculated exhaust gas.

8. The diagnosis device according to claim 1, wherein the fluid is an intake air flowing in an intake pipe connected to the engine; and the cooler is an intercooler arranged on the intake pipe.

9. The diagnosis device according to claim 1, wherein the fluid is a recirculated exhaust gas which is discharged from the engine and recirculated into the intake system; and the cooler is a recirculated exhaust gas cooler configured to cool the recirculated exhaust gas.

10. The diagnosis device according to claim 1, wherein the electronic control unit calculates the estimated sensor output value in real time.

11. The diagnosis device according to claim 1, wherein the engine is a diesel engine.

* * * * *